United States Patent [19]

Screen

[11] Patent Number: 4,747,180
[45] Date of Patent: May 31, 1988

[54] CASTOR INCORPORATING A BRAKING MECHANISM

[75] Inventor: Stafford T. Screen, Stourbridge, England

[73] Assignee: Colson Castors (U.K.), West Bromwich, United Kingdom

[21] Appl. No.: 874,952

[22] Filed: Jun. 16, 1986

[30] Foreign Application Priority Data

Jun. 17, 1985 [GB] United Kingdom ............... 8515266

[51] Int. Cl.[4] .............................................. B60B 33/02
[52] U.S. Cl. ........................................ 16/35 R; 16/33
[58] Field of Search ................... 16/19, 32, 33, 35 R, 16/47, 48; 188/1.12

[56] References Cited

U.S. PATENT DOCUMENTS

| | | | |
|---|---|---|---|
| 1,133,798 | 3/1915 | Hall | 16/32 |
| 1,174,582 | 3/1916 | Irrgang | 16/32 |
| 3,914,821 | 10/1975 | Screen | 16/35 R |
| 4,339,842 | 7/1982 | Fontana et al. | 16/32 |
| 4,364,148 | 12/1982 | McVicker | |
| 4,503,943 | 3/1985 | Tsukui | |

FOREIGN PATENT DOCUMENTS

| | | | |
|---|---|---|---|
| 1391000 | 1/1965 | France | 16/33 |
| 198662 | 9/1938 | Switzerland | 16/33 |
| 270068 | 5/1927 | United Kingdom. | |
| 1272174 | 4/1972 | United Kingdom. | |
| 1510207 | 5/1978 | United Kingdom. | |
| 2061718 | 5/1981 | United Kingdom. | |

*Primary Examiner*—Fred Silverberg
*Attorney, Agent, or Firm*—Neuman, Williams, Anderson & Olson

[57] ABSTRACT

A castor has a brake rod (20;120;220) extending through a hollow stem (10) on which a body (4) carrying a pair of castor wheels (2) is rotatably mounted. The brake rod is moveable substantially vertically between an inoperative position and a braking position in which its lower end engages the surface on which the wheel (2) rest. Opposition to braking movement can be provided by a return spring (39;222) or by a spring arm (122). Movement of the brake rod can be effected by a cam (140) acting on the spring arm (122) or by a cam (40;240) acting on a lever (35;230) engaging the upper end of the brake rod. The brake rod (10) can be arranged to have an intermediate position in which rotation of the castor body (4) is prevented.

14 Claims, 3 Drawing Sheets

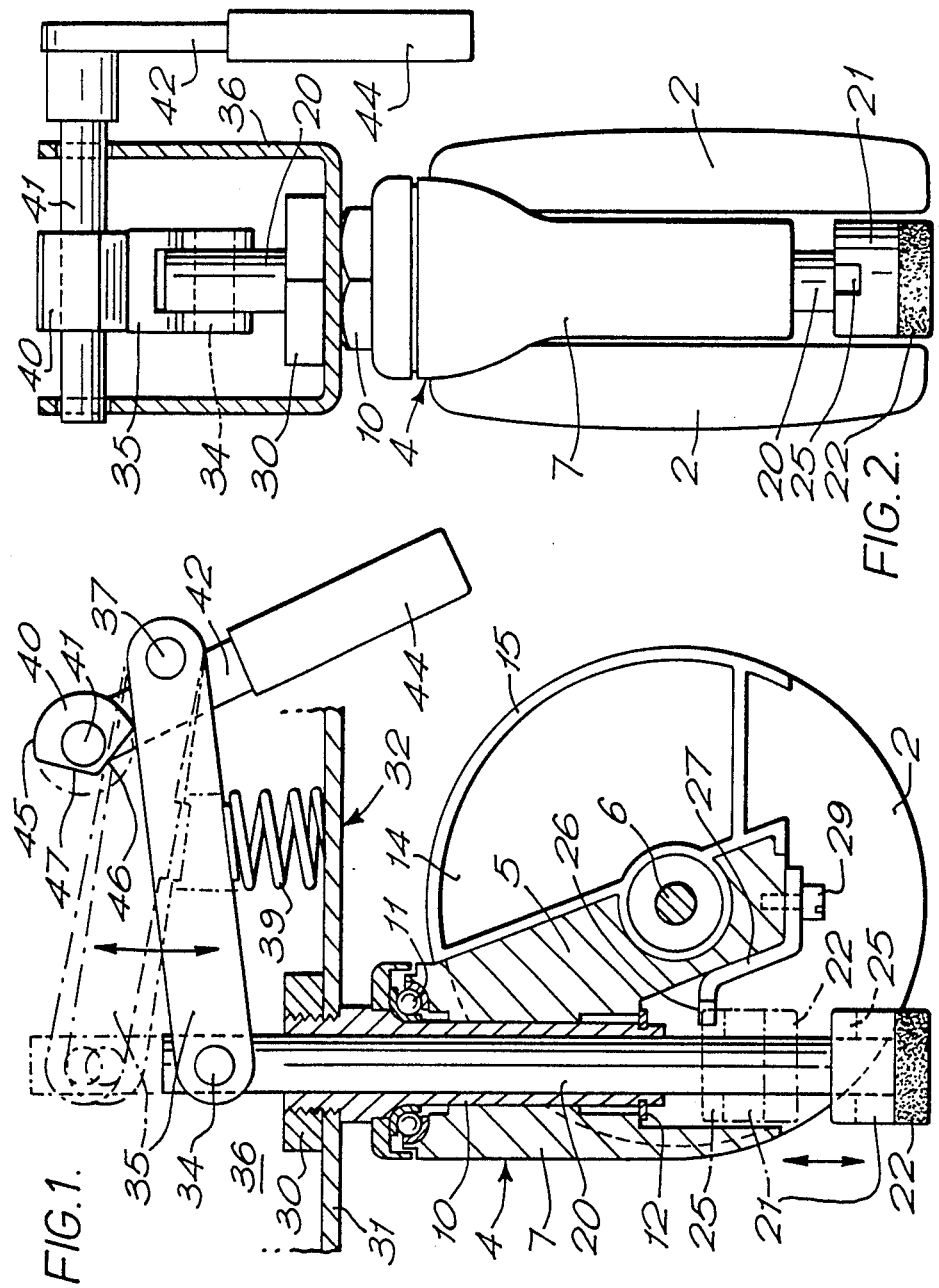

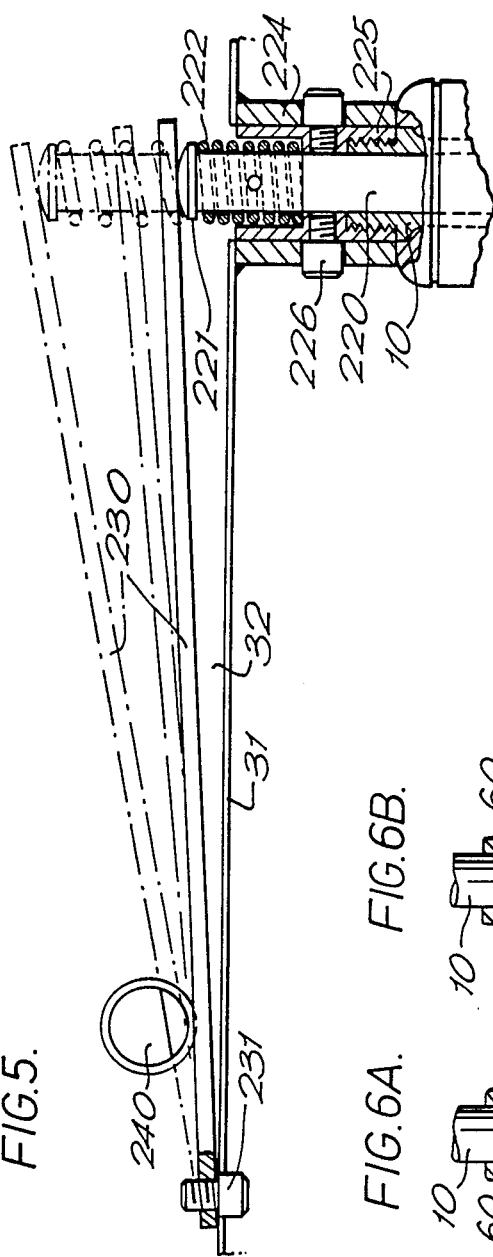

CASTOR INCORPORATING A BRAKING MECHANISM

FIELD OF THE INVENTION

The invention relates to a castor and more particularly to a castor incorporating a braking mechanism.

BACKGROUND OF THE INVENTION

There are a variety of uses for castors in which it is a requirement that the castor can be selectively braked against movement over a floor or other ground surface on which the castor rests. Such braking can be achieved by preventing rotation of the castor wheel or wheels but the braking effect is then obtained by engagement between the wheels and the floor which requires wheels of material with high friction whereas, wheels of low friction material are desirable for easy movement on the castors of a furniture article supported thereon. Also, the castor has to incorporate a relatively complicated braking structure and the means to effect its operation.

It is accordingly an object of the invention to provide a castor with braking means independent of its castor wheel or wheels. It is also an object of the invention to provide a castor braking arrangement of simple construction. It is a further object of the invention to provide a castor with a braking device which can be operated by control arrangements separate from the castor. It is also an object of the invention to provide castor braking arrangements whereby a plurality of castors can be positively braked by a single control means.

SUMMARY OF THE INVENTION

In accordance with the invention there is provided a castor having at least one wheel rotatably mounted on a body, a mounting member on which the body is carried for rotation in use about a substantially vertical axis spaced from the wheel axis, and a brake element movable in a substantially vertical direction between an inoperative raised position and a ground-engaging braking position.

Conveniently the brake element moves along the substantially vertical axis. The invention is thus preferably embodied as a castor in which the brake element is carried at the lower end of a shaft slidably guided within a hollow mounting member. The castor body is conveniently located between a pair of ground engaging wheels which it carries for rotation about a common substantially horizontal axis. The brake element may be movable between braking and non-braking positions only but it may have a third position in which it engages with the body so as to retain this in a predetermined angular orientation about the vertical axis with respect to the mounting member.

The brake element can be moved between its positions by any suitable mechanism, which is not necessarily an integral part of the castor. The operating mechanism can be such as to effect braking simultaneously of two or more castors if required. Conveniently a cam mechanism is employed, the cam being rotatable manually or by a pedal to move the brake element to the braking position against a spring bias. The brake element, which may be a pad or rubber or the like, may be below the level at which the wheel or wheels engage the ground in its lowered, braking, position.

Preferably, the spring bias is arranged to accomodate the end part of the movement of the brake element to the position thereof below the wheel, so that this is not lifted clear of the floor and continues to play a role in supporting the bed or other article of furniture which the castor supports.

The invention thus provides a castor which can be securely braked. The brake element can be of high friction material for secure locking, whilst the castor wheel or wheels can be of low friction material to allow easy movement of the article which the castor is supporting. The brake element, being not in contact with the floor except when in use, tends to maintain its friction coefficient because it is unlikely to acquiire for example polish from a polished floor. The ground-engaging part of the brake element moreover can be arranged to be readily replaceable. The castor can be made electrically conductive through the brake element if required.

BRIEF DESCRIPTION OF THE DRAWINGS

The invention is further explained below by way of illustration with reference to the accompanying drawings; in which:

FIG. 1 is a schematic side view, partially in section of a first castor embodying the invention, shown in the braking position;

FIG. 2 is a front view of the castor of FIG. 1;

FIGS. 4 and 5 are views resembling that of FIG. 1 of a second and a third castor embodying the invention respectively; and FIGS. 6A and 6B are fragmentary view of alternative brake pad arrangement.

Figure 3:
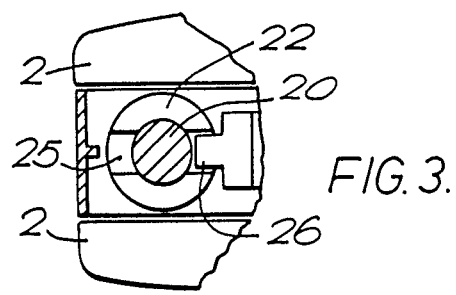
FIG. 3 is a fragmentary sectional plan view of the castor of FIG. 1.

Referring to the drawings, the castor illustrated in FIGS. 1 and 2 comprises a pair of like wheels 2 and a body 4. The wheels 2 may be integrally moulded plastics shells with hub and ground-engaging rim portions, or the rim portions can carry tyres of rubber or other suitable material.

The wheels 2 are journalled for rotation about a common substantially horizontal axis on a central portion 5 of the body 4. The body portion 5 is located between the wheels and is apertured to receive a steel pin 6, the end of which are received in the hub portions of the wheels 2.

Forwardly of the apertured centre portion 5, the body 4 has an integrally formed front portion 7 with an upright circular cross-section bore receiving a hollow stem 10 forming part of a mounting structure by which the castor can be mounted on an article of furniture. Between the upper end of the body front portion 7 and a downwardly facing step on the stem 10 there is received a bearing 11 in the form of a ball bearing which accommodates swivelling of the body about the generally vertical axis of the stem, and which transmits the load represented by the weight of the furniture article to the body 4 and thus through the wheels 2 to a floor on which they rest. The body 4 is retained on the stem 10 by a washer and split collar connection 12 at the lower end of the stem. Projecting rearwardly from the body centre portion 5 is a wall 14 extending to a cylindrical wall 15 which follows the outer periphery of the wheels 2 and substantially fills the space between them.

A brake rod 20 is received in the central bore of the stem 10 and is slidably guided for longitudinal movement therein. At its lower end, the rod 20 has a foot portion 21 of enlarged area carrying a pad 22 of rubber or other suitable resilient material. The annular upper surface of the foot 21 is formed with diametrically opposed grooves 25 of rectangular cross-section either of which can receive therein, in the uppermost position of the rod 20, the free end 26 of a bracket 27 secured by a bolt 29 to the underpart of the body portion 5, as shown in FIG. 3.

The rod 20 has a range of vertical movement between a lower braking position, shown in solid line, in which the lower surface of the pad 22 is slightly below the lowest, floor-engaging, portion of the wheels 2, and the uppermost shown in broken line in FIG. 1, in which the foot 21 and the pad are substantially completely received within a recess in the body portion 7 having the connection 12 at its upper end. In this uppermost position, the pad 22 is raised well above the floor on which the wheels 2 are resting, so the brake mechanism is inoperative, but the bracket end 26 is received in one or other of the grooves 25 so that the castor is held against swivelling, with the wheels free to rotate but orientated in a predetermined direction relative to the rod 20. The rod 20 cannot rotate within the stem 10, so the body orientation is fixed relative to the mounting structure. The rod 20 can also be retained in an intermediate position in which the pad 22 is again sufficiently raised for the braking mechanism to be inoperative, whilst the pas is below the bracket end 26 so that the body can rotate freely about the stem 10.

The movement of the rod 20 between its end and intermediate positions can be effected by any convenient mechanism. As shown in FIGS. 1 and 2, the stem 10 has a screw-threaded upper end received within a nut 30 secured to the floor 31 of a channel member 32 which accommodates such a mechanism. The upper end of the rod 20 projects at all times above the stem 10 and nut 30, and is pivotally connected by way of a transverse pivot pin 34 to the forked end of a lever 35, which extends to a pivotal connection to the side walls 36 of the channel member 32 effected by a pivot pin 37 parallel to the pin 30. The rod 20 is biassed upwardly by means of a helical compression spring 39 received between the lever 35 and the floor 31.

The angular position of the lever 35 about the pivot pin 37, and thus the longitudinal position of the brake end 20, is controlled by a cam member 40 which engages the upper side of the lever. The cam member 40 is rotated on a shaft 41 extending transversely between the side walls 36 and projecting beyond one of them to connect to an operating arm 42 provided at its free end with a cover 44, conveniently of plastics material, to facilitate operation manually or by an operator's foot. The shaft 41 can extend to the braking mechanism of a like castor, the two castors being at adjacent corners of a hospital bed for example.

In the position shown in solid line in FIG. 1, the lever 35 and the rod 20 are held in the lowermost positions, the spring 39 being under maximum compression, by engagement of a circular cylindrical cam surface portion 45 of the cam of greatest radius with the upper side of the lever. In this position, the lower face of the pad 22 is slightly below the lowest point of the wheels 2, so the wheels provide no effective support for the article of furniture, which is effectively braked against movement by the frictional engagement of the floor by the pad, and the body 4 can freely rotate on the stem 10.

The braking effect is released by swinging of the arm 42 counterclockwise from the position shown in solid line in FIG. 1 to bring into engagement with the upper side of the lever 35 a first plane cam face 46 of the member 40 which is in a plane nearly tangential to the shaft 41. The spring 39 is then able to urge the lever 35 upwardly to the intermediate broken line position of FIG. 1 in which the shaft 20 has been raised to bring the lower face of the pad 22 well above the lowest point of the wheels which accordingly resume their normal rolling support function for the furniture article, the bracket end 26 being above the top of the foot 21. Further counterclockwise rotation of the arm 42 brings into engagement with the lever 35 a second plane face 47 of the cam under 41 such that the lever can pivot further upwardly to the uppermost position, also shown in broken line in FIG. 1, in which the bracket end 26 is received in one of the grooves 25 just as soon as the body 4 swivels into one of the predetermined angular locations in which this can happen.

The second and third castors of FIGS. 4 and 5 correspond to that of FIGS. 1–3 in all respects except as noted below. Identical parts of the castors are identified by the same reference numerals.

Figure 4:
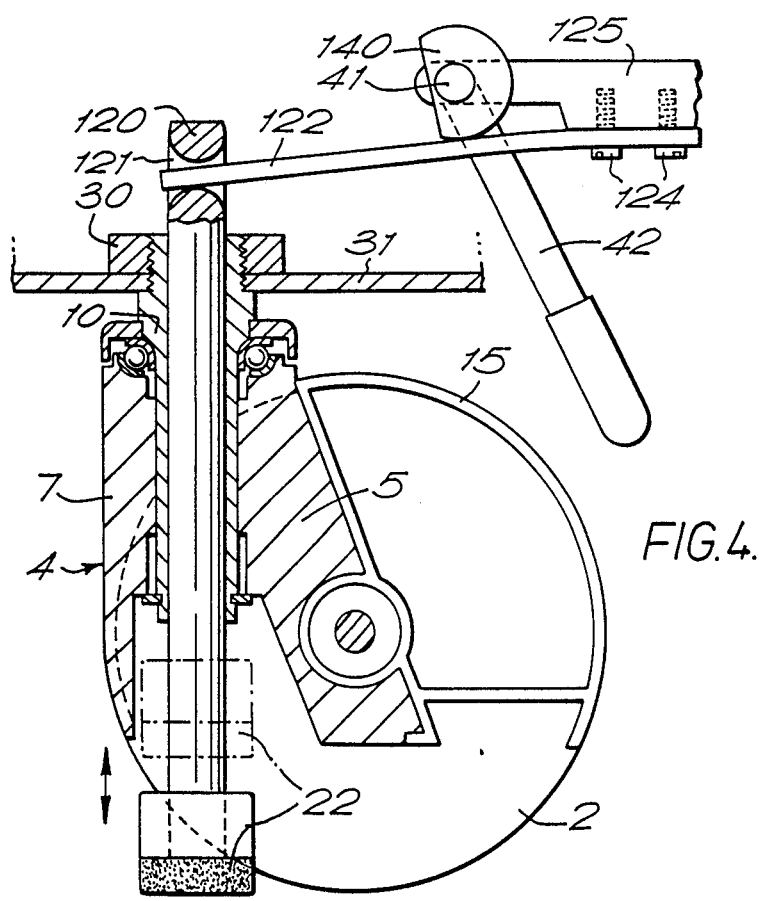

In the second castor, of FIG. 4, a rod 120 functions in the same way as the rod 20 of FIGS. 1–3, except in that it moves between uppermost and lowermost positions only, without being held in an intermediate position, the bracket 27 and grooves 25 being absent. The upper end of the rod 120 has a transverse aperture 121 defined by opposed circular cylindrical or otherwise rounded upper and lower surfaces. Received within the aperture 121 is the free end of a spring strip 122 of which the other end is connected by bolts 124 to a generally horizontal under surface of a mounting member 125 secured to the side walls 36 of the channel member 32. The member 125 also journals the shaft 41 of a cam 140 which engages the upper side of the spring strip 122.

The castor is shown in FIG. 4 in the braking position, in which the spring strip 122 is fully stressed by a circular cylindrical cam surface portion of the cam 140. Counterclockwise rotation of the arm 42 and thus of the cam 140 engages a single flat cam surface portion with the strip 122 which allows the strip to return under its own resilience to a more nearly horizontal, unstressed, position in which the rod 120 is in its uppermost position and the brake mechanism is released. The operating mechanism of the castor of FIG. 3 requires fewer parts than that of FIGS. 1 and 2, to which it can of course be applied, and the resilience of the spring strip 122 accommodates the vertical spacing between the floor engaging parts of the wheels 2 and the lower surface of the pad 22 in the braking position. Application of the brake mechanism consequently does not lift the furniture article to bring the wheels 2 clear of the floor, so that these still serve a weight supporting function.

In the third castor, of FIG. 5, a rod 220 functions similarly to the rod 120 of FIG. 4, in not being arranged to be held in a position intermediate its uppermost and lowermost positions. At its upper end the rod 220 is domed and has a flange 221 against which bears the upper end of a compression spring 222 coiled around the rod. In place of the nut 30, the channel member 32 has depending therefrom a sleeve 224 and the screw-threaded upper end of the stem 10 is received within the tapped lower end of an inner sleeve 225 within the sleeve 224. Bolts 226 extend radially into the sleeve 225 through aligned apertures in the sleeve walls to provide support for the lower end of the spring 222.

The domed upper end of the rod 220 is at all times above the floor 31 of the channel member 32 and engaged by one end of a bar 230 of which the other end is secured to the floor by means of a bolt 231. A cam 240, similar in shape to the cam 140, and similarly mounted, bears on the bar near its secured end.

In the position shown a circular cylindrical cam surface of the cam 140 bears on the bar 230, of which the free end urges the rod 220 to its lowermost position, with compression of the spring 222. Suitable rotation of the cam 240 brings a flat cam face thereof into engagement with the beam 230 which allows the spring 222 to act as a return spring, raising the rod 220 to its uppermost position, as shown in broken line.

The castors of FIGS. 4 and 5 can be readily modified to provide an intermediate position for the brake element for locking the body 4 against rotation, as with the castor of FIG. 1-3.

As shown in FIGS. 6A and 6B, the foot 21 and pad 22 can be replaced by a pad 60 recessed to receive the lower end of the rod 10, 12 or 220 therein. The pad 60 may be of rubber or suitable plastics material, for example, polyurethane or, as shown in FIG. 6B, it may be an aluminium diecasting secured by a pin 61. A layer 62 of high life rubber can be banded to the underside of the pad.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not a limiting except to the extent set forth in the claims appended hereto.

What is claimed is:

1. A castor comprising:
   mounting means for said castor,
   a body carried by said mounting means for rotation about an upright swivel axis,
   wheel means mounted on said body for rotation about a wheel axis spaced from said swivel axis,
   an elongate brake element axially slidable along said swivel axis between an inoperative position in which the lower end of said brake element is above a support surface on which said wheel means rests and a braking position in which said lower end brakingly engages said support surface,
   an elongate resilient operating element carried by said mounting means and having a movable end engaged with said brake element at the upper end thereof, and
   control means selectively operable to act on said operating element to effect movement of said movable end thereof to thereby move said brake element between said positions thereof wherein said control means slidably engages said operating element between the ends thereof, the end of said operating element remote from said movable end and remote from the swivel axis being fixed to said mounting means.

2. The castor of claim 1 wherein said control means comprises a cam shaped so that rotation thereof effects said movement of said operating element movable end.

3. The castor of claim 1 wherein the resilience of said resilient operating element opposes movement thereof by said control means to move said brake element into said operative position.

4. The castor of claim 1 further comprising spring means acting between said brake element and said mounting means to oppose said brake element movement to said operative position.

5. The castor of claim 1 wherein said mounting means comprises a channel member having a floor and side walls, wherein said body is carried externally of said channel member by said floor, and wherein said operating member is accommodated within said channel member.

6. A castor comprising:
   a body,
   wheel means carried by said body for rotation about a wheel axis,
   mounting means for mounting said castor as an article to be supported thereby, said mounting means carrying said body for rotation about an upright swivel axis spaced from said wheel axis,
   an elongate brake member mounted for lengthwise sliding movement along said upright swivel axis between an inoperative position in which the lower end thereof is above a support surface on which said wheel means rests and an operative position in which said lower end brakingly engages said support surface,
   an elongate operating member extending laterally of said brake member and having a movable end engaging said brake member at the upper end thereof,
   cam means engaged with said operating member at a position spaced from said end thereof and rotatable to alter the position thereof to thereby move said brake member between said inoperative and operative positions wherein said cam means slidably engages said operating member between the ends thereof, the end of said operating member remote from said movable end and remote from the swivel axis being directly pivotally mounted to said mounting means.

7. The castor of claim 6 further comprising means holding said elongate brake member against rotational movement thereof, and cooperating configurations on said brake member and on said body, said configurations being engageable in the inoperative position of said brake member to thereby hold said body on said mounting means in a predetermined angular position.

8. The castor of claim 6 wherein said lower end of said brake element is substantially completely received within said body in said inoperative position.

9. The castor of claim 6 having means pivotally connecting said operating member to said brake member, said cam means being engaged with said operating member between said pivotal connection means.

10. The castor of claim 9 further comprising spring means acting between said operating member and said mounting means to oppose said brake member movement to said operative position.

11. The castor of claim 6 wherein said elongate operating member is a resilient member adapted to be stressed by said cam means in at least one of said positions of said brake member.

12. A castor comprising:
   a hollow elongate mounting member for mounting said castor on an article to be supported thereby,
   a body carried by said mounting member for rotation about a substantially vertical swivel axis,
   wheel means mounted on said body for rotation about a substantially horizontal axis spaced from said swivel axis,
   an elongate brake element received within said hollow elongate mounting member for non-rotational axial movement between an inoperative position in which the lower end of said brake element is above a support surface on which said wheel means rest and a braking position in which said lower end brakingly engages said support surface, control means for selectively moving said brake element between said positions thereof, and co-operable configurations on said brake element and said body, said configurations being engageable in said operative position of said brake element to thereby hold said body on said mounting member in a predetermined angular position.

13. The castor of claim 12 wherein said brake element lower end comprises an enlarged foot portion having an upper surface and wherein said brake element configurations are formed in said upper surface.

14. The castor of claim 12 wherein said control means is adapted for selectively moving said brake element to an intermediate position in which said brake element lower end is above said support surface and said co-operable configurations are disengaged.

* * * * *